(12) United States Patent
Suwa

(10) Patent No.: US 10,503,561 B2
(45) Date of Patent: Dec. 10, 2019

(54) PARTICLE SIMULATION APPARATUS AND COMPUTER RESOURCE ALLOCATING METHOD

(71) Applicant: FUJITSU LIMITED, Kawasaki-shi, Kanagawa (JP)

(72) Inventor: Tamon Suwa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 466 days.

(21) Appl. No.: 15/265,945

(22) Filed: Sep. 15, 2016

(65) Prior Publication Data
US 2017/0132048 A1 May 11, 2017

(30) Foreign Application Priority Data
Nov. 11, 2015 (JP) ................................ 2015-221493

(51) Int. Cl.
| | |
|---|---|
| G06G 7/50 | (2006.01) |
| G06F 9/50 | (2006.01) |
| G06F 15/80 | (2006.01) |
| G06F 17/50 | (2006.01) |

(52) U.S. Cl.
CPC ............ *G06F 9/5066* (2013.01); *G06F 15/80* (2013.01); *G06F 17/5009* (2013.01); *G06F 2217/16* (2013.01)

(58) Field of Classification Search
None
See application file for complete search history.

(56) References Cited

U.S. PATENT DOCUMENTS

| | | | | |
|---|---|---|---|---|
| 4,855,903 A | * | 8/1989 | Carleton | ............ G06F 13/1657 709/248 |
| 2007/0250296 A1 | * | 10/2007 | Shima | ..................... G01W 1/10 703/2 |

(Continued)

FOREIGN PATENT DOCUMENTS

| | | | |
|---|---|---|---|
| JP | 05-274277 | * 10/1993 | ............ G06F 15/16 |
| JP | 5-274277 | 10/1993 | |
| JP | 2012-128793 | 7/2012 | |

OTHER PUBLICATIONS

Nakashima, Hiroshi et al., "OhHelp: A Scalable Domain-Decomposing Dynamic Load Balancing for Particle-in-Cell Simulation", Jun. 9-12, 2009, ICS '09, ACM. (Year: 2009).*

(Continued)

*Primary Examiner* — Cedric Johnson
(74) *Attorney, Agent, or Firm* — Fujitsu Patent Center

(57) ABSTRACT

A parallel computer that includes a plurality of nodes assigns to each of the nodes a partial region that is a division of a region in which a plurality of types of particles are distributed, and executes a plurality of programs for a particle simulation by each of the nodes. Then, according to a type of a processing-target particle of each of the plurality of programs and an execution time of each of the plurality of programs, the parallel computer determines a computation cost for each of a plurality of processing-target particles of each of the plurality of types. Subsequently, the parallel computer changes a position of a region boundary of the partial region according to the computation cost and the number of the processing-target particles of each of the plurality of types.

9 Claims, 17 Drawing Sheets

(56) References Cited

U.S. PATENT DOCUMENTS

2008/0189093 A1* 8/2008 Fitch .................. G06F 19/16
    703/11
2008/0234990 A1* 9/2008 Bowers ............... G06F 19/701
    703/1

OTHER PUBLICATIONS

*SAP America, Inc.* V. *Investpic, LLC.*, United States Court of Appeals for the Federal Circuit, 2017. (Year: 2017).*

* cited by examiner

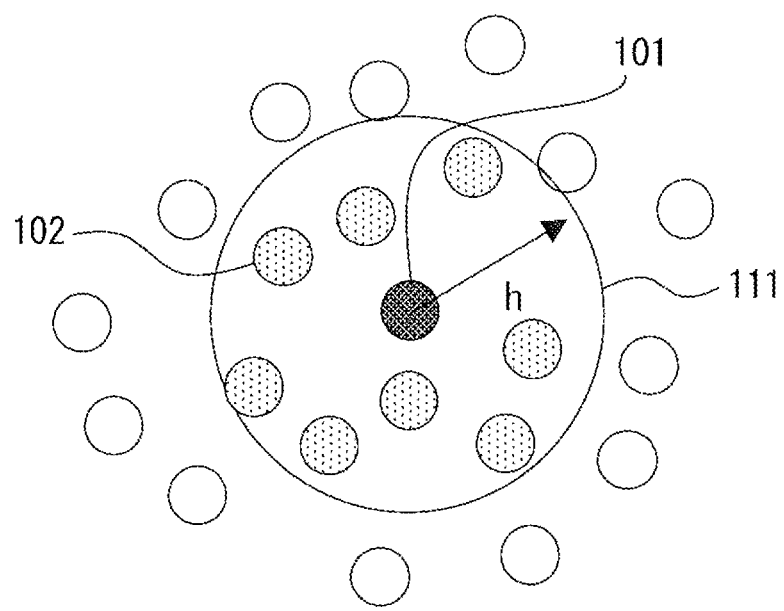
F I G. 1

| EXECUTION ORDER | SUBROUTINE ID | PARTICLE TYPE |
| --- | --- | --- |
| 1 | R1 | A, B |
| 2 | R2 | A |
| 3 | R3 | B |
| 4 | R4 | A |

FIG. 11

| SUBROUTINE ID | EXECUTION TIME |
|:---:|:---:|
| R1 | T1 |
| R2 | T2 |
| R3 | T3 |
| R4 | T4 |

F I G. 1 2

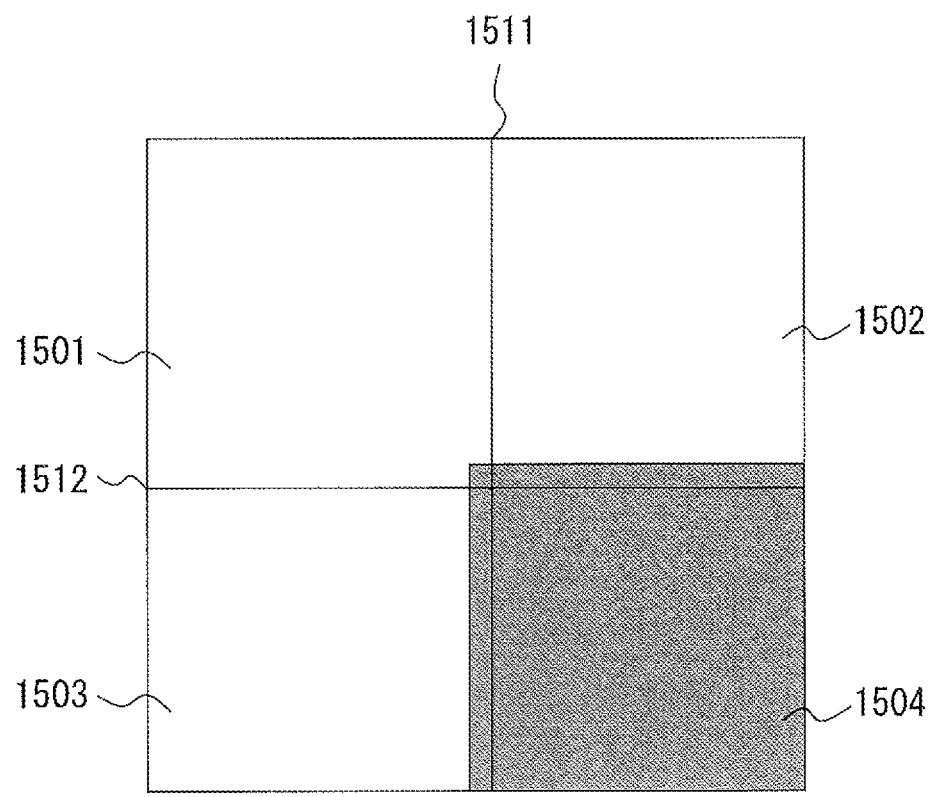
F I G. 1 5

PARTICLE SIMULATION APPARATUS AND COMPUTER RESOURCE ALLOCATING METHOD

CROSS-REFERENCE TO RELATED APPLICATION

This application is based upon and claims the benefit of priority of the prior Japanese Patent Application No. 2015-221493, filed on Nov. 11, 2015, the entire contents of which are incorporated herein by reference.

FIELD

The embodiments discussed herein are related to a particle simulation apparatus and a computer resource allocating method.

BACKGROUND

In numerical calculations of fluid analyses for surveying water or air flow or elastic body analyses for surveying the behavior of compressed rubber or the like, particle methods are sometimes used to represent continuous bodies such as fluids and elastic bodies by using particle distribution. Specific examples of known particle methods are, for example, a Smoothed Particles Hydrodynamics (SPH) method and a Moving Particles Semi-implicit (MPS) method.

A particle state calculating apparatus is also known that calculates a particle state in accordance with distributed-memory parallel computing (see, for example, patent document 1). For particles distributed within a simulation space, a molecular dynamics calculation apparatus is also known that divides the simulation space into divisions each including the same number of particles (see, for example, patent document 2).

Patent document 1: Japanese Laid-open Patent Publication No. 2012-128793
Patent document 2: Japanese Laid-open Patent Publication No. 5-274277

SUMMARY

According to an aspect of the embodiments, a non-transitory computer-readable recording medium stores therein a particle simulation program. The particle simulation program causes a parallel computer that includes a plurality of nodes to execute the following processes.

(1) The parallel computer assigns to each node a partial region that is a division of a region in which a plurality of types of particles are distributed, and executes a plurality of programs for a particle simulation by each of the nodes.

(2) According to a type of a processing-target particle of each of the plurality of programs and an execution time of each of the plurality of programs, the parallel computer determines a calculation cost for each of a plurality of processing-target particles of each of the plurality of types.

(3) The parallel computer changes a position of a region boundary of the partial region according to the calculation cost and the number of the processing-target particles of each of the plurality of types.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a region of influence;
FIG. 11 illustrates subroutine data;
FIG. 12 illustrates execution times of subroutines;
FIG. 15 illustrates partial regions based on the number of particles.

DESCRIPTION OF EMBODIMENTS

The following describes embodiments in detail with reference to the drawings.

In an embodiment, a calculation-target region in which particles are distributed may be a three-dimensional space, or may be a two-dimensional space. In a particle method, a particle motion is analyzed by calculating interactions from only neighbor particles present within a region of influence designated in advance for the particle.

FIG. 1 depicts an example of such a region of influence. A region of influence 111 for a particle 101 is represented by a circle or sphere with radius h that is centered at the particle 101. A motion of the particle 101 is calculated according to interactions from a plurality of neighbor particles 102 within the region of influence 111.

In calculations in the particle method, many particles are often dealt with to achieve a desired resolution while designating a wide calculation-target region. Hundreds of millions of particles are used when, for example, a region shaped like a five-kilometer square with a resolution of 1 m is dealt with in flooding calculation directed to a tsunami. For such large-scale calculations, parallel computers that include many nodes are widely used. In the domain decomposition method used in patent document 1 and the like, parallel computing is performed by dividing a calculation-target region into a plurality of partial regions, each of which is assigned to one of the plurality of nodes.

Figure 2:
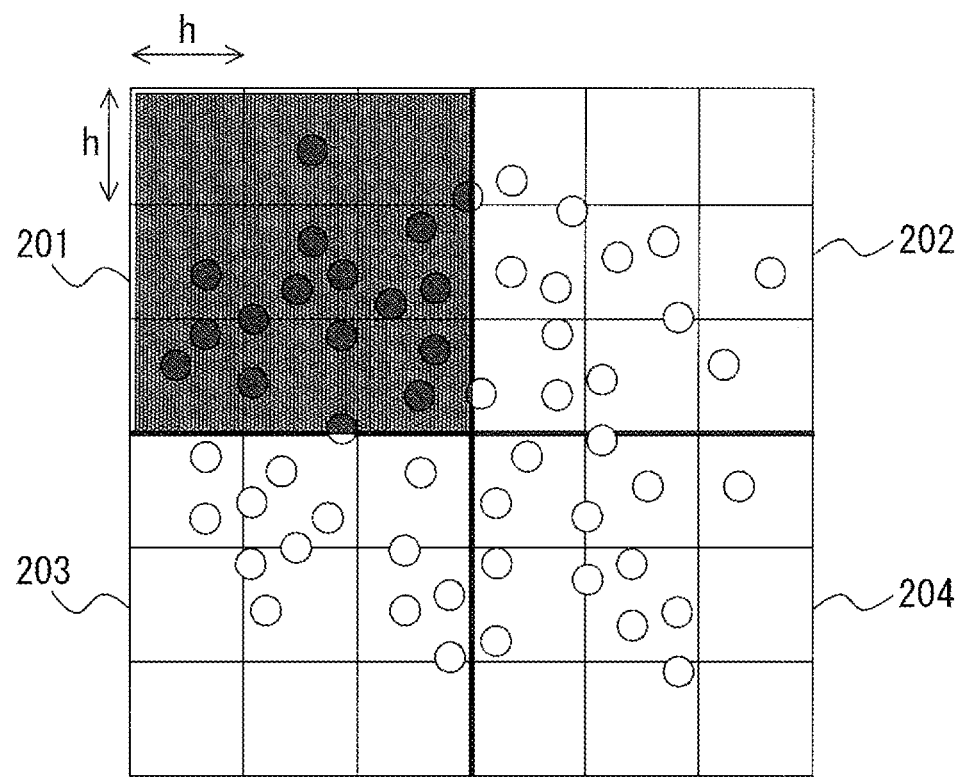
FIG. 2 illustrates domain decomposition.

FIG. 2 depicts an example of such domain decomposition. In the domain decomposition in FIG. 2, a calculation-target region is divided into partial regions 201-204, and four nodes each take charge of one partial region and each perform calculations for particles within the partial region the node is in charge of. The meshes in each partial region indicate a square or cube with horizontal and vertical sizes that are equal to the length of radius h, i.e., the radius of the region of influence 111 in FIG. 1.

Motions of each particle are affected by neighbor particles within a region of influence, and hence particles within a range from a boundary between partial regions up to distance h (skirt particles) affect particles within an adjacent partial region. Accordingly, each node identifies skirt particles within a partial region the node is in charge of, and sends information on the skirt particles to a node in charge of an adjacent partial region.

Figure 3:
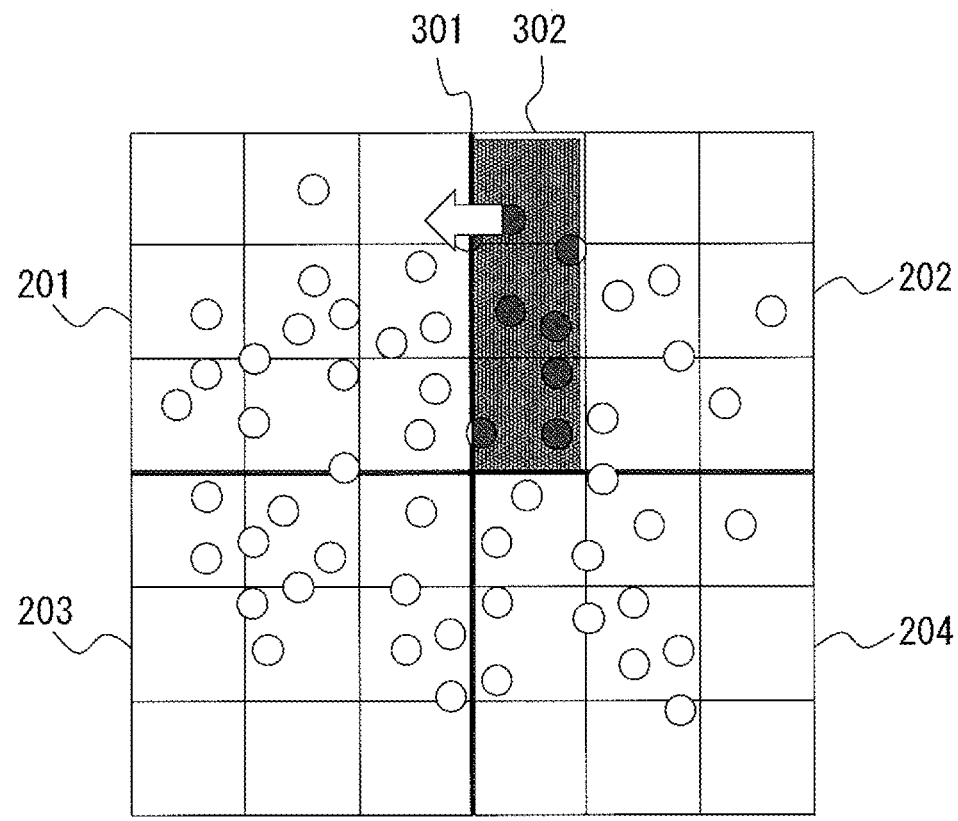
FIG. 3 illustrates skirt particles.

FIG. 3 depicts examples of such skirt particles. A node in charge of the partial region 202 identifies skirt particles within a range 302 extending from a boundary 301 up to distance h, and sends information on the skirt particles to a node in charge of the partial region 201. Upon receipt of the information on the skirt particles, the node analyzes particle motions within the partial region 201 using the information. Simultaneously, for example, the node in charge of the partial region 201 may update a density by solving a continuity equation or may update a velocity and position coordinates using an acceleration obtained by solving an equation of motion.

Figure 4:
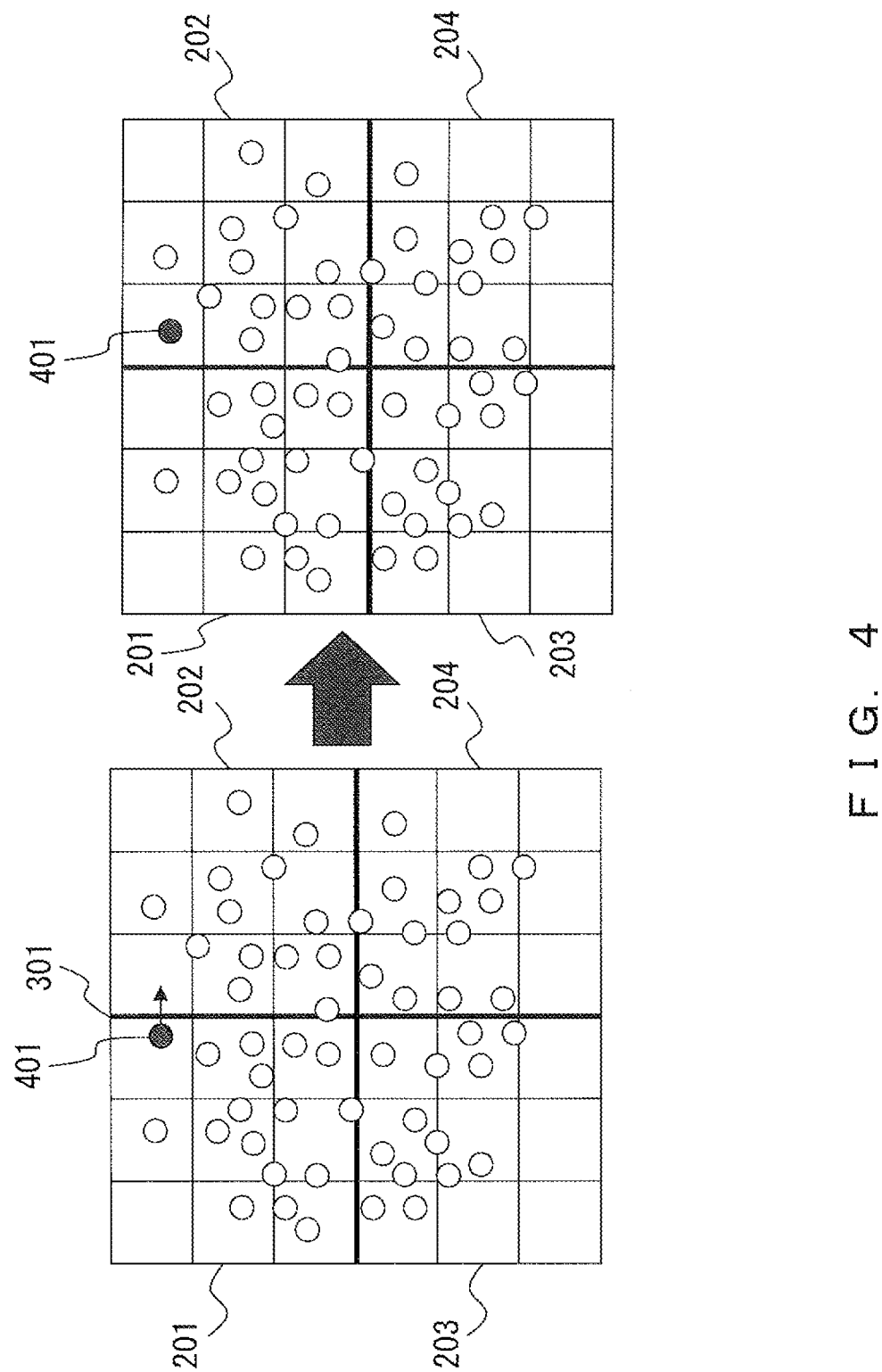
FIG. 4 illustrates a particle migration between partial regions.

FIG. 4 illustrates an exemplary particle migration between partial regions. In parallel computing, a particle motion is calculated for each time step of a particle simulation. When a particle 401 present within the partial region 201 in a certain time step has migrated to the partial region 202 beyond the boundary 301 in a next time step, the node in charge of the partial region 201 sends information on the particle 401 to the node in charge of the partial region 202. This allows the node in charge of the partial region 202 to analyze motions of the particle 401.

A difference between nodes in timing of ending parallel computing in a certain time step leads to a needless waiting time, thereby decreasing the efficiency of parallel computing (parallelization efficiency). Accordingly, some techniques have been proposed to equalize calculation times between a plurality of nodes, such as the technique described in patent document 2.

However, in the conventional domain decomposition method, boundaries between partial regions are determined with reference to the number of particles, and hence an optimum parallelization efficiency is not always obtained in the following situations.

(a) A plurality of types of particles, such as those representing a fluid, those representing a structure, and those representing an elastic body, are present.

(b) A calculation amount (calculation cost) is different for each type of particle.

(c) The pattern of particle distribution is different for each type of particle.

Figure 5:
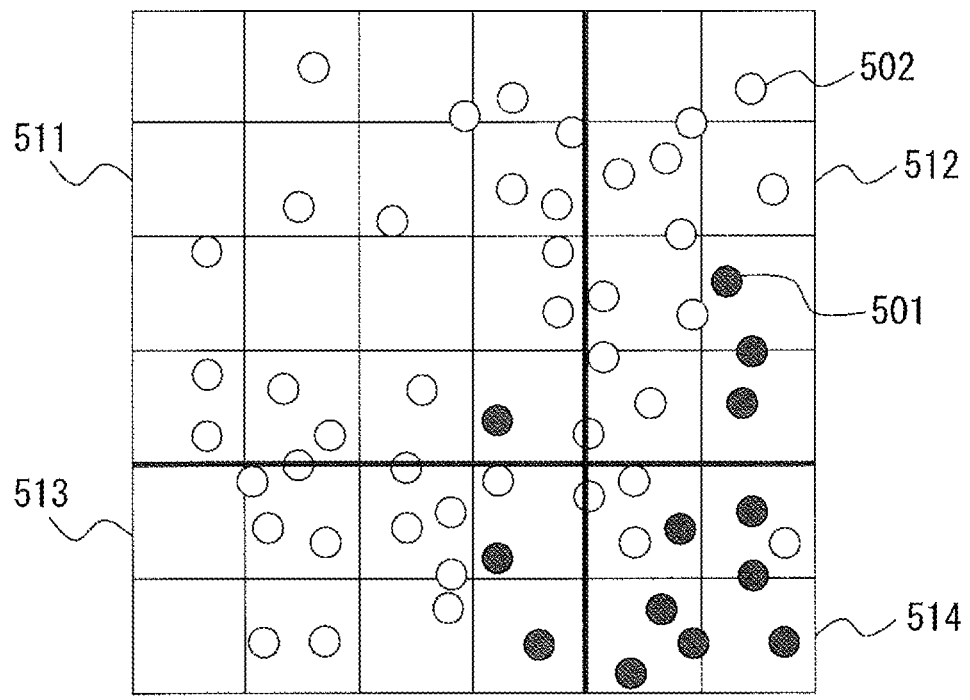
FIG. 5 illustrates a calculation-target region in which a plurality of types of particles are present.

FIG. 5 illustrates an exemplary calculation-target region in which a plurality of types of particles are present. Particles of type A representing a fluid, particles 501, and particles of type B representing a structure, particles 502, are present within the calculation-target region in FIG. 5. The fluid-representing particles 501 move every time step, while the position of the structure-representing particles 502 does not change. Hence, the calculation amount for the particles 501 is considered to be larger than that for the particles 502.

When the calculation-target region is divided into partial regions 511-514 each including an equal number of particles, the calculation amount for the partial region 514 is far larger than those for the partial regions 511-513. This worsens a load balance between nodes and thus decreases the parallelization efficiency.

As described above, no techniques are known to allocate computer resources efficiently to each particle in performing a simulation of a particle method based on a parallel computer with a plurality of nodes that is directed to a space in which a plurality of types of particles each featuring a different calculation amount are present.

Such a problem is not limited to fluid analyses or elastic body analyses but also occurs in other simulations for particles, including other continuous bodies.

Figure 6:
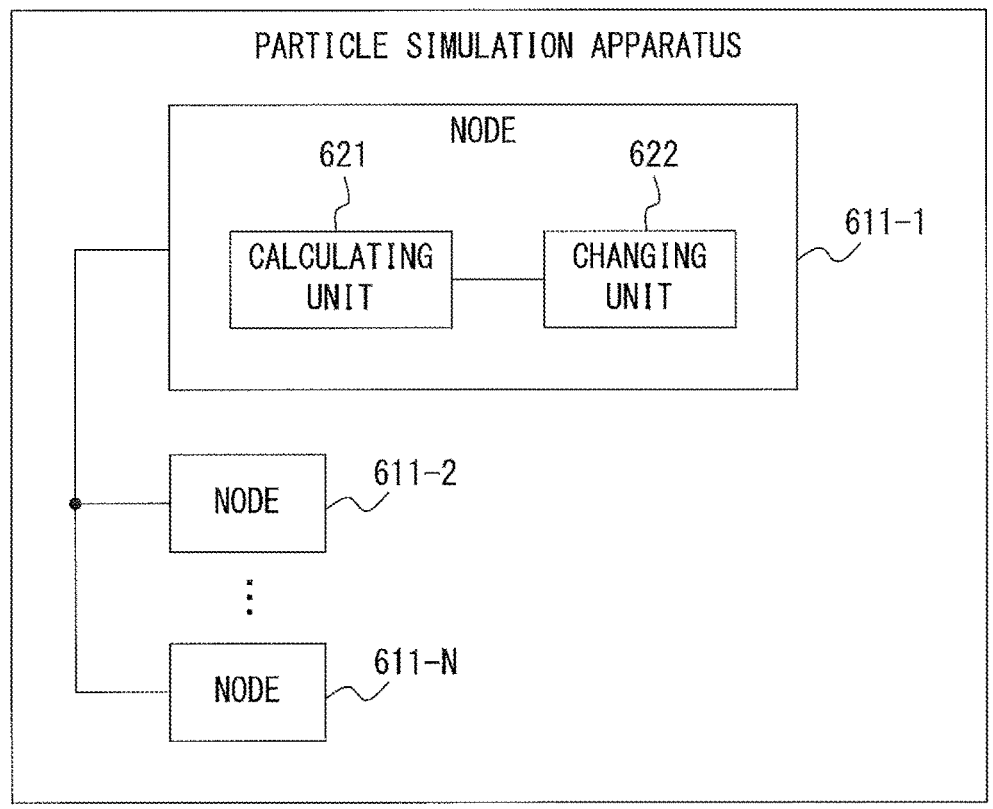
FIG. 6 is a functional configuration diagram of a particle simulation apparatus.

FIG. 6 depicts an exemplary functional configuration of a particle simulation apparatus in accordance with an embodiment. A particle simulation apparatus 601 in FIG. 6 corresponds to, for example, a parallel computer, and includes N nodes, nodes 611-1 to 611-N (N is an integer that is two or greater). The particle simulation apparatus 601 assigns to each node a partial region obtained by dividing a region in which a plurality of types of particles are distributed (calculation-target region), and executes, by each node, a plurality of programs for a particle simulation. The node 611-1 includes a calculating unit 621 and a changing unit 622 and performs a computer resource allocating process in the particle simulation.

Figure 7:
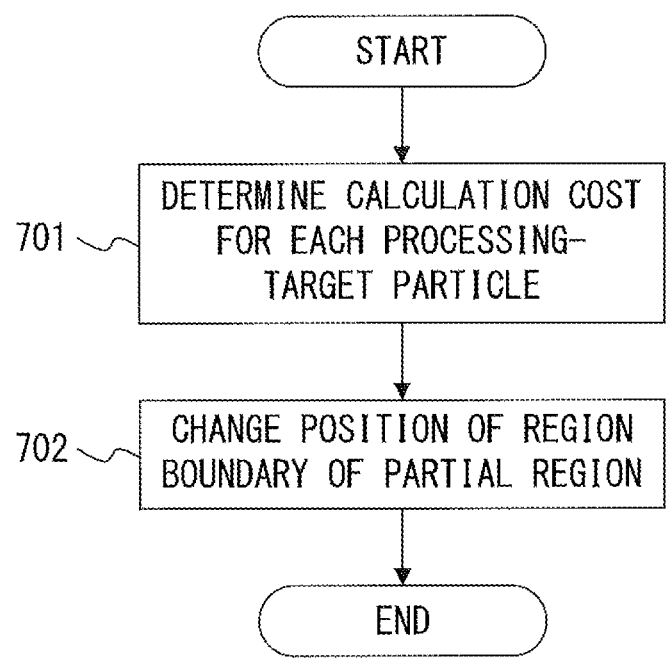
FIG. 7 is a flowchart of a computer resource allocating process.

FIG. 7 is a flowchart illustrating an exemplary computer resource allocating process performed by the node 611-1 in FIG. 6. According to a type of a processing-target particle of each of a plurality of programs and an execution time of each of the plurality of programs, the calculating unit 621 determines a calculation cost for each processing-target particle (step 701). The changing unit 622 changes a position of a region boundary of a partial region according to the calculation cost and the number of processing-target particles of each type (step 702).

The particle simulation apparatus 601 in FIG. 6 may allocate computer resources efficiently in a particle simulation directed to a plurality of particle types that is performed by a parallel computer.

Figure 8:
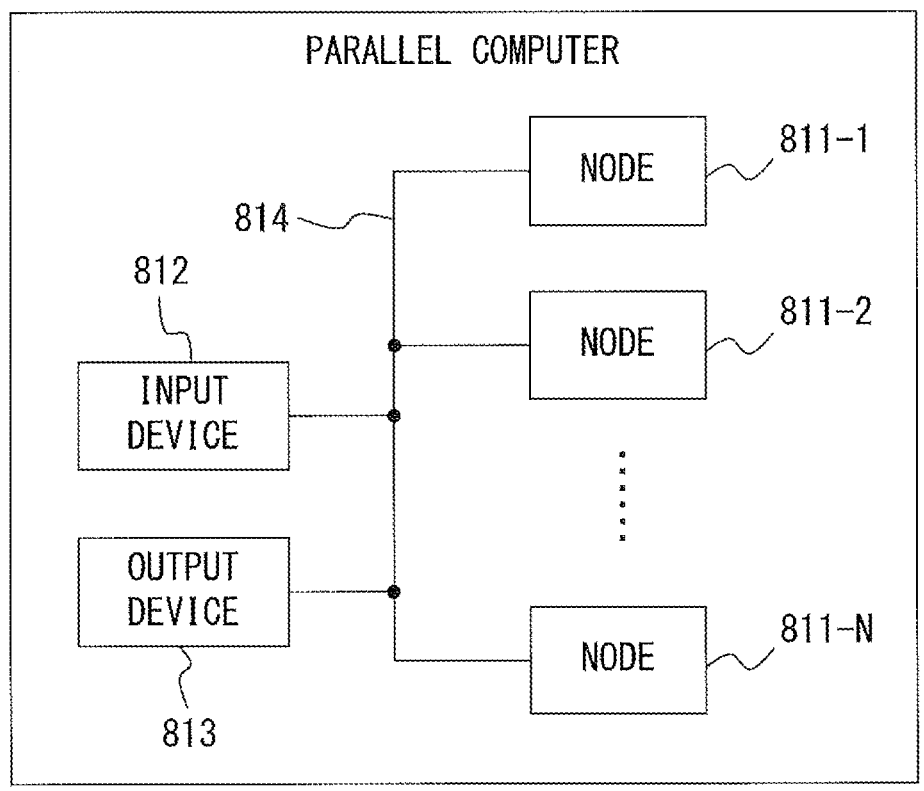
FIG. 8 is a configuration diagram of a parallel computer.

FIG. 8 depicts an exemplary configuration of a parallel computer. A parallel computer 801 in FIG. 8 corresponds to the particle simulation apparatus 601 in FIG. 6 and includes nodes 811-1 to 811-N, an input device 812, and an output device 813. The nodes 811-1 to 811-N, the input device 812, and the output device 813 are connected to each other over a communication network 814.

The nodes 811-1 to 811-N respectively correspond to the nodes 611-1 to 611-N in FIG. 6 and execute a plurality of subroutines corresponding to the plurality of programs for the particle simulation.

The input device 812 is, for example, a keyboard or a pointing device, and is used to input instructions or information from an operator or a user. The output device 813 is, for example, a display device, a printer, or a speaker, and is used to output a query to the operator or the user, or a processing result. The processing result may be a simulation result from the particle simulation.

The parallel computer 801 does not need to include all of the elements in FIG. 8, and one or more of the elements may be removed according to the intended use or conditions. For example, the input device 812 may be removed when an instruction or information from the operator or the user does not need to be input. The output device 813 may be removed when a query to the operator or the user or a processing result does not need to be output.

Figure 9:
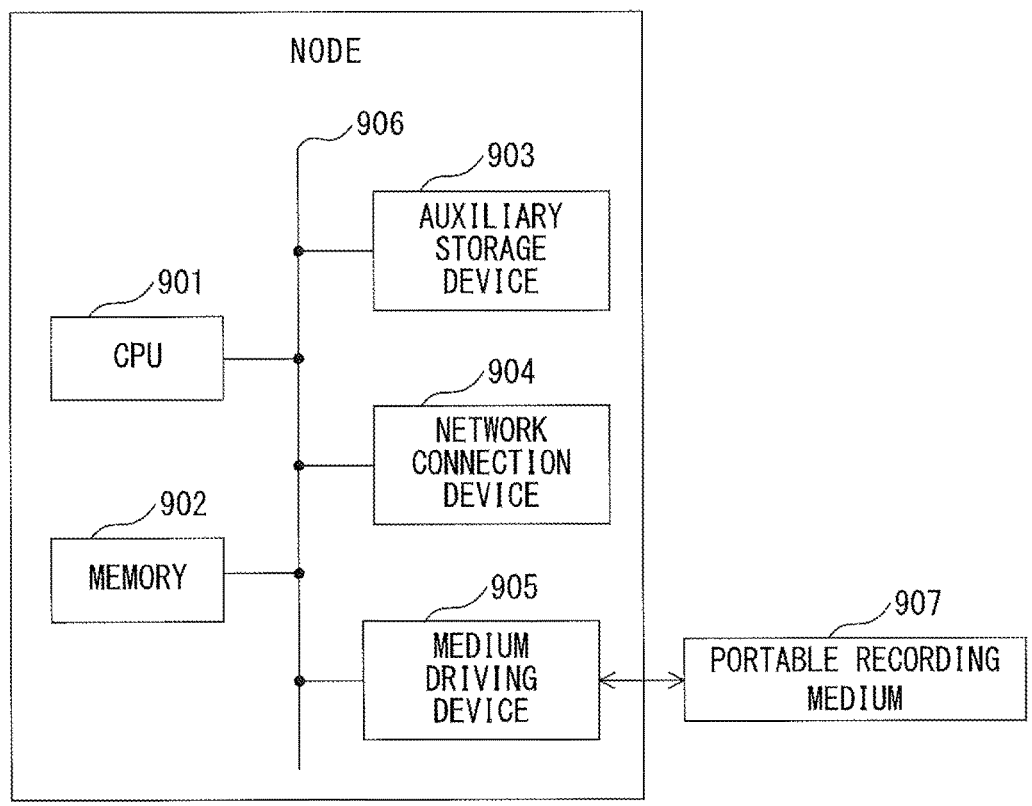
FIG. 9 is a configuration diagram of a node.

FIG. 9 depicts an exemplary configuration of an information processing apparatus corresponding to a node 811-i (i=1 to N) in FIG. 8. The node 811-*i* in FIG. 9 includes a Central Processing Unit (CPU) 901, a memory 902, an auxiliary storage device 903, a network connection device 904, and a medium driving device 905. The CPU 901, the memory 902, the auxiliary storage device 903, the network connection device 904, and the medium driving device 905 are connected to each other by a bus 906.

The memory 902 is, for example, a semiconductor memory such as a Read Only Memory (ROM) or a Random Access Memory (RAM), and stores a program and data to be used for a particle simulation.

The CPU 901 (processor) operates as the calculating unit 621 and changing unit 622 in FIG. 6 by, for example, executing a program using the memory 902. The CPU 901 also executes the plurality of subroutines for the particle simulation.

The auxiliary storage device 903 is, for example, a magnetic disk device, an optical disk device, or a magneto-optical disk device. The auxiliary storage device 903 may be a hard disk drive. The node 811-*i* may store a program and data in the auxiliary storage device 903 and load them into the memory 902 for use.

The network connection device 904 is a communication interface that is connected to the communication network 814 in FIG. 8 and that performs data conversion associated with a communication. The node 811-*i* may receive a program and data from another node or an apparatus provided outside the parallel computer 801 over the communication network 814, and may load them into the memory 902 for use.

The medium driving device 905 drives a portable recording medium 907 and accesses items recorded therein. The portable recording medium 907 is, for example, a memory device, a flexible disk, an optical disk, or a magneto-optical disk. The portable recording medium 907 may be, for example, a Compact Disk Read Only Memory (CD-ROM), a Digital Versatile Disk (DVD), or a Universal Serial Bus (USB) memory. The operator or the user may store a program and data in the portable recording medium 907 and load them into the memory 902 for use.

As described above, a computer-readable recording medium that stores a program and data to be used for the particle simulation is a physical (non-transitory) recording medium such as the memory 902, the auxiliary storage device 903, or the portable recording medium 907.

The node 811-*i* does not need to include all of the elements in FIG. 9, and one or more of the elements may be removed according to the intended use or conditions. For example, the auxiliary storage device 903 may be removed when programs and data are received over the communication network 814. The medium driving device 905 may be removed when the portable recording medium 907 is not used.

The nodes 811-1 to 811-N of the parallel computer 801 execute the plurality of subroutines for each time step of the particle simulation (simulation step) and calculate motions of the plurality of types of particles. In this case, using information indicating the type of the processing-target particles of each of the plurality of subroutines and an execution time of each of the plurality of subroutines within a certain time step, the node 811-1 determines a cost coefficient representing a weight for each particle type. The cost coefficient is an indicator of calculation amount per particle.

The node 811-1 divides the calculation-target region into N partial regions according to a calculation amount of each particle type. A calculation amount of a certain type of particles may be determined by assigning a weight to the number of particles of that type according to the cost coefficient. In the next time step, the nodes 811-1 to 811-N execute the plurality of subroutines directed to particles included in the N partial regions obtained from the dividing. This allows the method of dividing the calculation-target region to be changed with a change in particle distribution.

The parallel computer 801 can be widely used for numerical calculations relying on a particle method. For example, a fluid analysis of river or sea water may be conducted for disaster prevention planning, and a casting process may be analyzed in designing a metal product. An elastic body analysis may be performed in designing a product so as to appropriately determine, for example, the shape of sealing gel.

Figure 10:
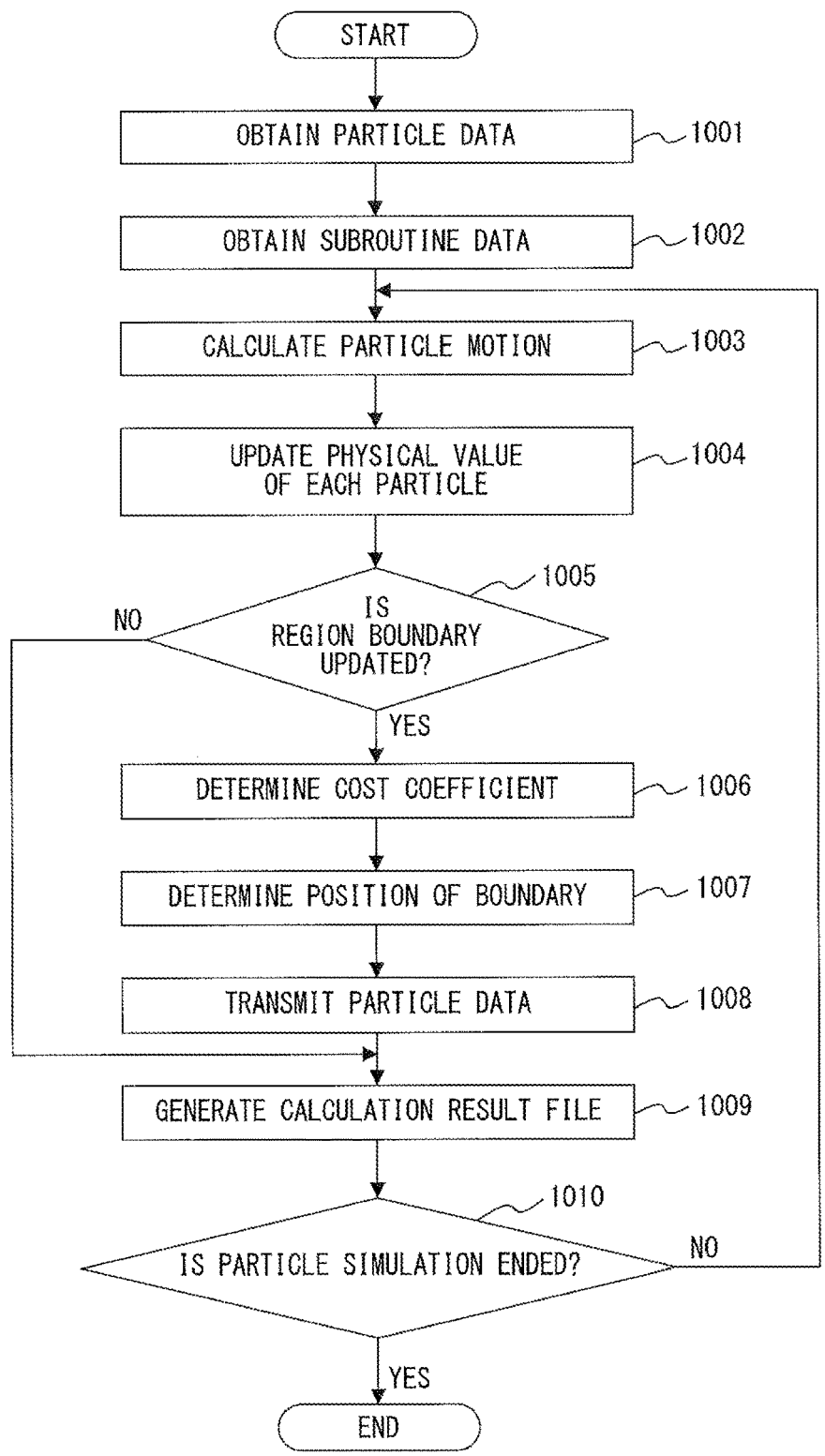
FIG. 10 is a flowchart of a particle simulation.

FIG. 10 is a flowchart illustrating an exemplary simulation performed by the parallel computer 801 in FIG. 8. The CPU 901 of the node 811-1 obtains and stores particle data input from the input device 812 or an apparatus external to the parallel computer 801 in the memory 902 (step 1001).

The particle data represents, for example, the position and velocity of each of a plurality of particles that represent a continuous body, such as a fluid, an elastic body, and a structure within a calculation-target region. For example, a movable particle, i.e., a particle that involves a position change, that is a direct target of a numerical calculation may be obtained by modeling, for example, a fluid or an elastic body. Particle data of each movable particle may include physical values such as a center coordinate, a velocity, a radius of a region of influence, a density, a mass, a deformation gradient tensor, a material property, and a temperature. A plurality of types of moving particles with different traveling speeds may be present in the calculation-target region.

Meanwhile, a structure particle, which does not involve a position change and simply defines a boundary condition for motions of movable particles, is obtained by modeling, for example, a wall of a container of a fluid. Particle data of each structure particle may include physical values such as a center coordinate, a normal vector of a plane element, and the area of the plane element.

The CPU 901 of the node 811-1 obtains and stores subroutine data input from the input device 812 or an external apparatus in the memory 902 (step 1002). The subroutine data indicates the type of processing-target particles for each of a plurality of subroutines.

FIG. 11 illustrates an example of subroutine data. The subroutine data in FIG. 11 includes execution order, subroutine ID, and particle type. Execution order indicates an order in which subroutines are executed, and subroutine ID is identification information of each subroutine. Particle type indicates the types of processing-target particles for each subroutine. Each subroutine is implemented by modeling an equation that is different for each type of processing-target particle. For example, executing the first subroutine R1 may trigger a calculation directed to two particle types, types A and B.

Each of the nodes 811-1 to 811-N calculates, in accordance with a physical model designated for movable particles within a partial region that the node is in charge of, motions of the movable particles for one time step (step 1003).

In the initial time step of the particle simulation, since a cost coefficient has not been determined, the CPU 901 of the node 811-1 divides the calculation-target region into N partial regions using a prescribed dividing method. The node

811-1 sends, to each of the nodes 811-2 to 811-N, subroutine data and particle data of partial regions the respective nodes are in charge of.

The CPU 901 of each node uses particle data of the partial region the node is in charge of, so as to execute, in the execution order, a plurality of subroutines indicated by subroutine data, and measures and stores an execution time of each subroutine in the memory 902. Simultaneously, the nodes 811-2 to 811-N send an execution time of each subroutine to the node 811-1. The CPU 901 of each node updates physical values of each particle using time derivative terms that include a calculated acceleration (step 1004).

The CPU 901 of the node 811-1 determines whether to update a region boundary (step 1005). The region boundary may be updated once every prescribed number of time steps set in advance. Alternatively, the region boundary may be updated when a variation in execution time of each subroutine between the nodes 811-1 to 811-N is equal to or greater than a prescribed value.

In updating the region boundary (YES in step 1005), the CPU 901 of the node 811-1 determines a cost coefficient for each particle type (step 1006). The cost coefficient is determined according to the execution time of each subroutine at the nodes 811-1 to 811-N and the particle types of each subroutine indicated by the subroutine data.

The CPU 901 of the node 811-1 determines a position for a boundary between partial regions according to a calculation amount specific to each type of particles (step 1007). A calculation amount for a certain type of particles may be determined by multiplying the number of particles of that type by the cost coefficient. For example, when the nodes 811-1 to 811-N each include almost the same amount of computer resources, a position for the border is determined such that each partial region features an equal calculation amount. The calculation amount for each partial region is indicated by, for example, a value obtained by calculating, for each particle type, the product of the number of particles and the cost coefficient and by summing all of the calculated products.

For each particle within a region for which another node has started to be in charge due to the updating of the region boundary, each node sends particle data indicating the physical value updated in step 1004 to the other node (step 1008).

The nodes 811-2 to 811-N send particle data of all particles they are in charge of to the node 811-1 (step 1009). Subsequently, the node 811-1 generates a calculation result file that includes particle data of the nodes 811-1 to 811-N, and stores this file in the auxiliary storage device 903. The output device 813 may output the particle data included in the calculation result file in the form of, for example, numerical data, a graph, or an image.

Meanwhile, the region boundary is not updated when a variation in execution time of each subroutine between the nodes 811-1 to 811-N is less than the prescribed value. When the region boundary is not updated (NO in step 1005), the parallel computer 801 performs the processes of step 1009 and the following steps.

The CPU 901 of the node 811-1 determines whether to end the particle simulation (step 1010). The parallel computer 801 may end the particle simulation when the number of time steps has reached an upper limit, or when a change in the physical value of particles has become less than a threshold.

When it has been determined that the particle simulation is not to be ended (NO in step 1010), the parallel computer 801 performs the processes of step 1003 and the following steps again for the subsequent time step. For the calculation in the subsequent time step, N partial regions are used that are obtained through dividing based on the boundaries after update. When it has been determined that the particle simulation is to be ended (YES in step 1010), the parallel computer 801 ends the process.

The particle simulation in FIG. 10 allows an appropriate region boundary to be designated in a calculation-target region in which a plurality of types of particles featuring different calculation amounts are present, so that the computer resources of the parallel computer can be allocated efficiently to a plurality of particles. This improves the parallelization efficiency so that the amount of computer resources to be mounted on each node can be decreased.

Assume, for example, that in a tsunami simulation, fluid particles of type A, which represent sea water, and structure particles of type B, which represent terrain and buildings, are distributed in a calculation-target region, where the number of fluid particles is NA, and the number of structure particles is NB. Further assume that the subroutine data of FIG. 11 has been input.

In this case, a subroutine R1 is, for example, one for preprocessing of generating a data structure for searching for neighbor particles within a region of influence of a certain particle, and is directed to particles of types A and B. A subroutine R2 is, for example, one for calculating a density by solving a continuity equation designed for fluid particles, and is directed to particles of type A.

A subroutine R3 is, for example, one for calculating a repulsive force from a structure particle to a fluid particle, and is directed to particles of type B. A subroutine R4 is, for example, one for calculating an acceleration by solving an equation of motion of fluid particles, and is directed to particles of type A. Navier-Stokes equations may be used as the equation of motion of fluid particles.

FIG. 12 illustrates exemplary execution times of the subroutines for a certain time step. The execution times of the subroutines R1 to R4 are T1 to T4, respectively. Execution time Tj (j=1 to 4) indicates the sum of the execution times of the subroutines Rj executed by the nodes 811-1 to 811-N. In this case, the following formula may express the total execution time T0 of the subroutines R1 to R4 in a certain time step.

$$T0 = T1 + T2 + T3 + T4 \tag{1}$$

Execution time Tj (j=1 to 4) may be considered to have a proportional relationship with the calculation amount of subroutine Rj, and total execution time T0 may be considered to have a proportional relationship with the total calculation amount of the subroutines R1 to R4 in one time step. Given that the execution time of each subroutine has a proportional relationship with the number of processing-target particles, the cost coefficient corresponds to a proportionality coefficient between an execution time for each particle type and the number of particles. In this case, the following formula may express total execution time T0 using CA, a cost coefficient of particles of type A, and CB, a cost coefficient of particles of type B.

$$T0 = CA*NA + CB*NB \tag{2}$$

The following formulae may express the execution times T1 to T4 of the subroutines.

$$T1 = G1*(NA+NB) \tag{3}$$

$$T2 = G2*NA \tag{4}$$

$$T3 = G3*NB \quad (5)$$

$$T4 = G4*NA \quad (6)$$

G1 to G4 express proportionality coefficients of the subroutines. The following formula is obtained from formulae (1) to (6).

$$\begin{aligned} T0 &= CA*NA + CB*NB \\ &= T1 + T2 + T3 + T4 \\ &= G1*(NA+NB) + G2*NA + G3*NB + G4*NA \\ &= (G1+G2+G4)*NA + (G1+G3)*NB \end{aligned} \quad (7)$$

The following formulae are obtained from formula (7).

$$CA = G1 + G2 + G4 \quad (8)$$

$$CB = G1 + G3 \quad (9)$$

The following formulae are obtained by modifying formulae (3) to (6).

$$G1 = T1/(NA+NB) \quad (10)$$

$$G2 = T2/NA \quad (11)$$

$$G3 = T3/NB \quad (12)$$

$$G4 = T4/NA \quad (13)$$

The following formulae are obtained by applying formulae (10) to (13) to G1 to G4 in formulae (8) and (9).

$$CA = T1/(NA+NB) + T2/NA + T4/NA \quad (14)$$

$$CB = T1/(NA+NB) + T3/NB \quad (15)$$

The CPU 901 of the node 811-1 can determine cost coefficients CA and CB from the execution times T1 to T4 of the subroutines using formulae (14) and (15). Determining cost coefficients according to measured execution times of the subroutines allows the cost coefficients to be adjusted in accordance with an execution environment of the particle simulation.

Figure 13:
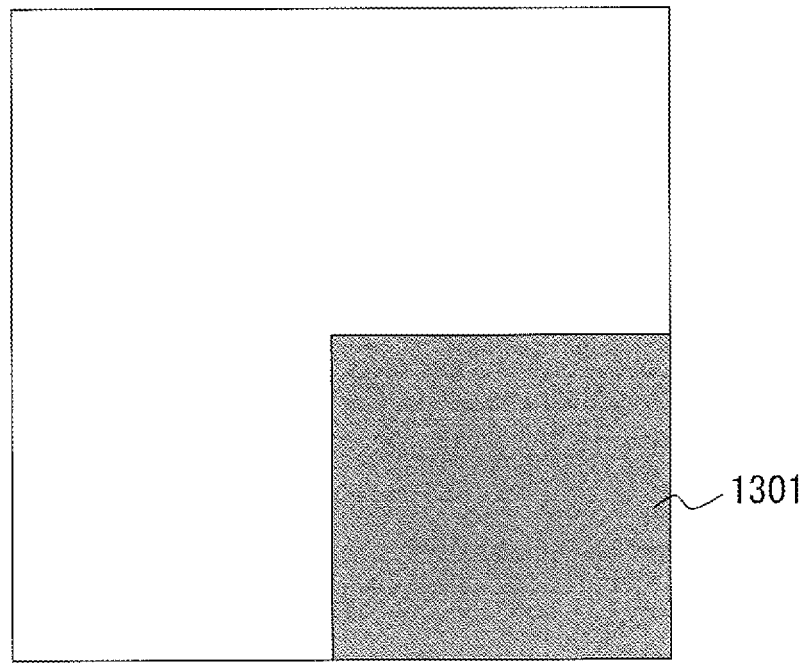
FIG. 13 illustrates particle distribution in a tsunami simulation.

FIG. 13 illustrates an example of particle distribution in an early stage of a tsunami simulation. In the early stage of the tsunami simulation, no sea water is present on land, and hence fluid particles are localized in a region 1301, which is a portion of a calculation-target region; by contrast, structure particles indicating terrain and buildings are almost uniformly distributed throughout the calculation-target region.

Assume that NA=10000 and NB=400000. In this case, 10000 fluid particles of type A are present in a region 1301, which corresponds to ¼ of the calculation target region, and 400000 structure particles of type B are present throughout the calculation-target region. CA=4.01e-4 and CB=3.69e-6 according to formulae (14) and (15), where T1=1 (sec), T2=2 (sec), T3=0.5 (sec), and T4=2 (sec). In this case, the cost coefficient CA of fluid particles is about 100 times the cost coefficient CB of structure particles.

Figure 14:
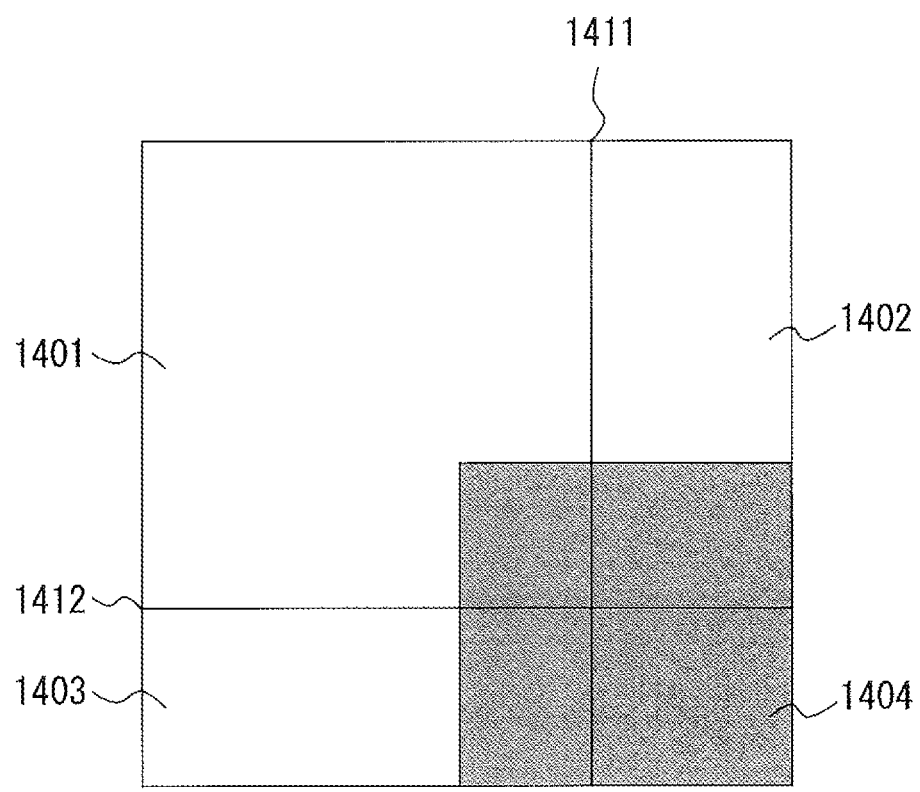
FIG. 14 illustrates partial regions based on cost coefficients.

FIG. 14 illustrates exemplary partial regions obtained by dividing the calculation-target region in FIG. 13 according to cost coefficients. In this example, the parallel computer 801 includes four nodes, and boundaries 1411 and 1412 divide the calculation-target region into partial regions 1401 to 1404. Positions are determined for the boundaries 1411 and 1412 such that each of the partial regions includes an equal sum of the product of the number of fluid particles and the cost coefficient CA and the product of the number of structure particles and the cost coefficient CB.

In this example, the nodes 811-1 to 811-4 are respectively in charge of calculations for the partial regions 1401 to 1404, and the calculation amounts of the nodes 811-1 to 811-4 are equalized. This leads to a preferable load balance between the nodes, thereby improving the parallelization efficiency.

FIG. 15 illustrates exemplary partial regions obtained by dividing the calculation-target region in FIG. 13 according to the number of particles alone. In this example, boundaries 1511 and 1512 divide the calculation-target region into partial regions 1501 to 1504. Positions are determined for the boundaries 1511 and 1512 such that each of the partial regions includes an equal sum of the number of fluid particles and the number of structure particles.

In this example, the nodes 811-1 to 811-4 are respectively in charge of calculations for the partial regions 1501 to 1504, and the calculation amount of the node 811-4 becomes far larger than those of the nodes 811-1 to 811-3. This leads to a bad load balance between the nodes, thereby decreasing the parallelization efficiency.

Figure 16:
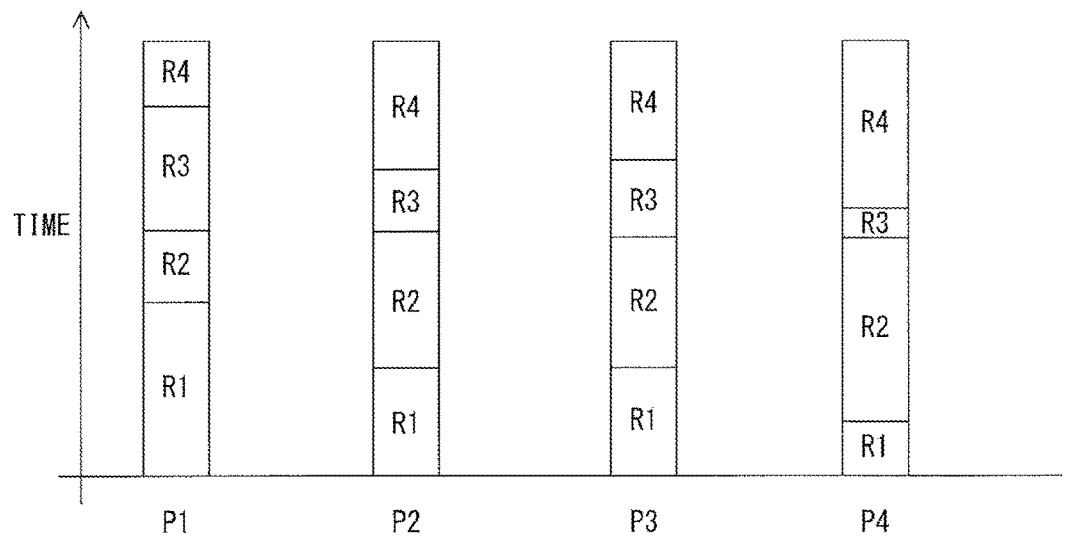
FIG. 16 illustrates execution times of subroutines for four nodes.

FIG. 16 illustrates exemplary execution times of subroutines for nodes 811-1 to 811-4. Processes P1 to P4 are respectively operates in the nodes 811-1 to 811-4, and execute subroutines R1 to R4 in a certain time step.

The execution time of each subroutine may be different for each of the processes. For example, the execution time of the subroutine R1 for the process P1 may be longer than the execution times of the subroutine R1 for the processes P2 to P4. The execution time of the subroutine R2 for the process P1 may be shorter than the execution times of the subroutine R2 for the processes P2 to P4.

Accordingly, the CPU 901 of the node 811-1 uses the sum of the execution times of subroutine Rj ($j=1$ to 4) for the nodes 811-1 to 811-4 as execution time Tj in formula (1). Consequently, cost coefficients CA and CB can be determined such that the calculation amounts of the nodes are equalized.

Figure 17:
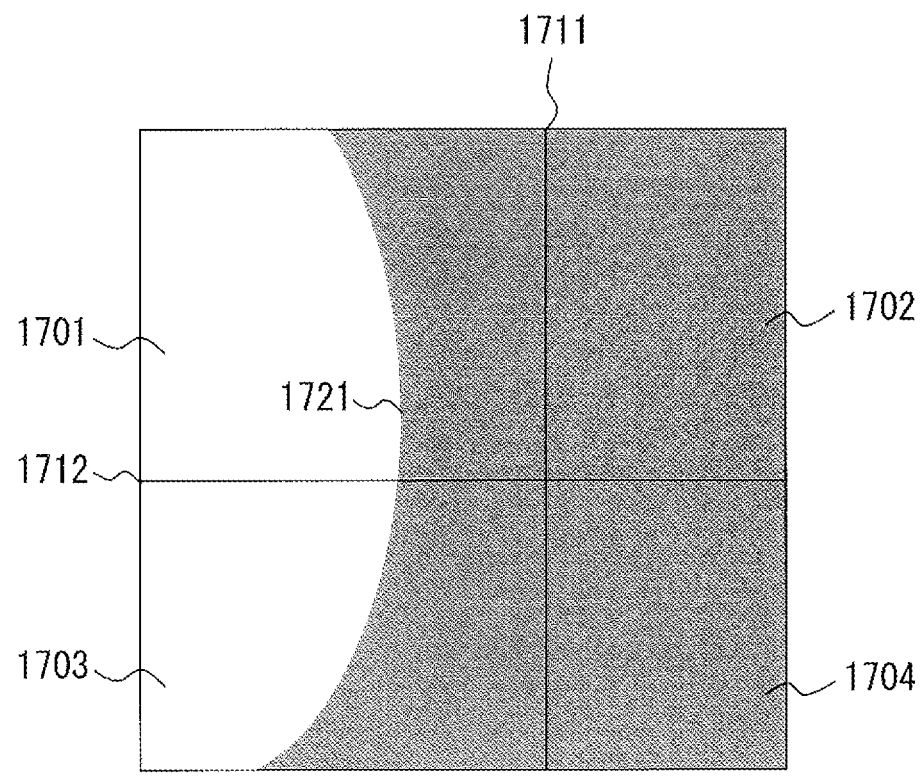
FIG. 17 illustrates partial regions after a tsunami simulation has progressed.

FIG. 17 illustrates exemplary partial regions after the tsunami simulation has progressed of the calculation-target region in FIG. 14. When flooding over land caused by a tsunami has grown as a result of calculations being in progress, fluid particles start to be distributed within a wide region 1721.

In this example, boundaries 1711 and 1712 determined according to cost coefficients divide the calculation-target region into partial regions 1701 to 1704. The nodes 811-1 to 811-4 are in charge of calculations for the partial regions 1701 to 1704, respectively. Accordingly, a change in particle distribution leads to a change in the positions of the region boundaries in a manner such that the calculation amounts are equalized between the partial regions.

Even when three or more types of particles featuring different calculation amounts are present, positions can be determined for region boundaries in accordance with the particle simulation in FIG. 10 such that calculation amounts are equalized between partial regions.

In the following, an exemplary situation is considered in which L types of particles are distributed within a calculation-target region, the particles including Nk particles of type k ($k=1$ to L), and nodes 811-1 to 811-N execute subroutines R1 to RM. The following formula may express T0, the total execution time of the subroutines R1 to RM in a certain time step.

$$T0 = T1 + T2 + \ldots + TM \quad (21)$$

Execution time Tj (j=1 to M) in formula (21) expresses the execution time of the subroutine Rj. The following formula may express total execution time T0 using a cost coefficient Ck of particles of type k (k=1 to L).

$$T0 = C1*N1 + C2*N2 + \ldots + CL*NL \quad (22)$$

The following formula may express the execution time Tj of each subroutine.

$$Tj = Gj*(Bj1*N1 + Bj2*N2 + \ldots + BjL*NL) \quad (23)$$

Bjk in formula (23) is 0 or 1. Bjk=1 when particles of type k are processing-target particles of the subroutine Rj; otherwise, Bjk=0. Gj represents a proportionality coefficient of the subroutine Rj. Formulae (21) to (23) provide the following formula.

$$\begin{aligned}
T0 &= C1*N1 + C2*N2 + \ldots + CL*NL \quad (24)\\
&= T1 + T2 + \ldots + TM \\
&= G1*(B11*N1 + B12*N2 + \ldots + B1L*NL) + \\
&\quad G2*(B21*N1 + B22*N2 + \ldots + B2L*NL) + \ldots + \\
&\quad GM(BM1*N1 + BM2*N2 + \ldots + BML*NL)\\
&= (G1*B11 + G2*B21 + \ldots + GM*BM1)*N1 + \\
&\quad (G1*B12 + G2*B22 + \ldots + GM*BM2)*N2 + \ldots + \\
&\quad (G1*B1L + G2*B2L + \ldots + GM*BML)*NL
\end{aligned}$$

Formula (24) provides the following formula.

$$Ck = G1*B1k + G2*B2k + \ldots + GM*BMk \quad (25)$$

The following is obtained by modifying formula (23).

$$Gj = Tj/(Bj1*N1 + Bj2*N2 + \ldots + BjL*NL) \quad (26)$$

The following is obtained by applying formula (26) to G1 to GM in formula (25).

$$\begin{aligned}
Ck &= T1*B1k/(B11*N1 + B12*N2 + \ldots + B1L*NL) + \quad (27)\\
&\quad T2*B2k/(B21*N1 + B22*N2 + \ldots + B2L*NL) + \ldots + \\
&\quad TM*BMk/(BM1*N1 + BM2*N2 + \ldots + BML*NL)
\end{aligned}$$

Using formula (27), the CPU 901 of the node 811-1 may determine cost coefficients C1 to CL from the execution times T1 to TM of the subroutines.

For example, in a simulation of a casting process, a calculation-target region may be used in which fluid particles of type A, which represent molten metal, and structure particles of type B, which represent a die, are distributed. In this case, for example, subroutine R5 may be executed subsequently to the subroutines R1 to R4 which are used in the tsunami simulation. The subroutine R5 is intended to, for example, calculate a temperature change caused by heat conduction by solving an energy equation, and is directed to particles of types A and B.

For example, a subroutine for calculating a deformation gradient tensor for movable particles representing an elastic body and a subroutine for determining a Cauchy stress from the deformation gradient tensor may be used in a simulation of the elastic body.

The configurations of the particle simulation apparatus 601 in FIG. 6, the parallel computer 801 in FIG. 8, and the node 811-i in FIG. 9 are merely examples. One or more of the elements may be removed according to the intended use or conditions of the particle simulation apparatus 601 and the parallel computer 801. For example, in the particle simulation apparatus 601 in FIG. 6, the nodes 611-2 to 611-N may execute the plurality of programs and the node 611-1 does not need to execute the plurality of programs. Similarly, in the parallel computer 801 in FIG. 8, the nodes 811-2 to 811-N may execute the plurality of subroutines and the node 811-1 does not need to execute the plurality of subroutines.

The flowcharts in FIGS. 7 and 10 are merely examples, and one or more of the processes may be removed or changed according to the configurations or conditions of the particle simulation apparatus 601 and the parallel computer 801. When, for example, a region boundary is updated every time step in the particle simulation in FIG. 10, the process of step 1005 may be removed.

When the nodes 811-1 to 811-N have different computer resources, the node 881-1 may determine positions of boundaries in step 1007 in FIG. 10 such that each partial region features a calculation amount that has a proportional relationship with the computer resource of each node.

The subroutine data in FIG. 11 is merely an example, and another type of subroutine data may be used. For example, there may be three or fewer, or five or more, subroutines. There may be three or more types of processing-target particles of subroutines. The execution times in FIGS. 12 and 16 are merely examples; execution times change with subroutines to be used, and also change every time step.

The particles, calculation-target regions, and partial regions in FIGS. 1-5, 13-15, and 17 are merely examples; other models may be used to perform the particle simulation. Fluid simulations directed to subjects that are different from tsunamis or a casting process, elastic-body simulations, or particle simulations for continuous bodies that are different from fluids and elastic bodies may be performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a particle simulation program causing a parallel computer that includes a plurality of nodes to execute a process comprising:
   assigning to each of the nodes a partial region that is a division of a region in which a plurality of types of particles are distributed, and executing a plurality of programs for a particle simulation by each of the nodes;
   determining a calculation cost for each of a plurality of processing-target particles of each of the plurality of types according to a type of a processing-target particle of each of the plurality of programs and an execution time of each of the plurality of programs; and
   changing a position of a region boundary of the partial region according to the calculation cost and a number of the plurality of processing-target particles of each of the plurality of types to improve parallelization efficiency by efficiently allocating computer operation.

2. The non-transitory computer-readable recording medium according to claim 1, wherein the process further comprises assigning the partial region determined by the changed region boundary to each of the nodes, and executing the plurality of programs for the particle simulation by each of the nodes.

3. The non-transitory computer-readable recording medium according to claim 1, wherein the parallel computer does not change the position of the region boundary when a variation in the execution time of each of the plurality of programs between the nodes is less than a prescribed value.

4. A particle simulation apparatus that includes a plurality of nodes, wherein:
the particle simulation apparatus assigns to each of the nodes a partial region that is a division of a region in which a plurality of types of particles are distributed, and executes a plurality of programs for a particle simulation by each of the nodes, and wherein
the particle simulation apparatus comprises:
a processor that determines a calculation cost for each of a plurality of processing-target particles of each of the plurality of types according to a type of a processing-target particle of each of the plurality of programs and an execution time of each of the plurality of programs, and that changes a position of a region boundary of the partial region according to the calculation cost and a number of the plurality of processing-target particles of each of the plurality of types to improve parallelization efficiency by efficiently allocating computer operation.

5. The particle simulation apparatus according to claim 4, wherein the particle simulation apparatus assigns the partial region determined by the changed region boundary to each of the nodes, and executes the plurality of programs for the particle simulation by each of the nodes.

6. The particle simulation apparatus according to claim 4, wherein the processor does not change the position of the region boundary when a variation in the execution time of each of the plurality of programs between the nodes is less than a prescribed value.

7. A computer resource allocating method in a particle simulation, the computer resource allocating method comprising:
assigning, by a parallel computer that includes a plurality of nodes, a partial region that is a division of a region in which a plurality of types of particles are distributed to each of the nodes, and executing a plurality of programs for a particle simulation by each of the nodes;
determining, by a processor, a calculation cost for each of a plurality of processing-target particles of each of the plurality of types according to a type of a processing-target particle of each of the plurality of programs and an execution time of each of the plurality of programs; and
changing, by the processor, a position of a region boundary of the partial region according to the calculation cost and a number of the plurality of processing-target particles of each of the plurality of types to improve parallelization efficiency by efficiently allocating computer operation.

8. The computer resource allocating method according to claim 7, further comprising:
assigning, by the parallel computer, the partial region determined by the changed region boundary to each of the nodes, and executing the plurality of programs for the particle simulation by each of the nodes.

9. The computer resource allocating method according to claim 7, wherein the processor does not change the position of the region boundary when a variation in the execution time of each of the plurality of programs between the nodes is less than a prescribed value.

* * * * *